INVENTOR.
GALEN W. CLEVENGER,
BY
Berman, Davidson & Berman
ATTORNEYS

Aug. 18, 1970     G. W. CLEVENGER     3,524,802
PROCESS TO RECOVER COPPER FROM SULFIDE CONCENTRATES
Filed Sept. 1, 1967     2 Sheets-Sheet 2

INVENTOR.
GALEN W. CLEVENGER,
BY
Berman, Davidson & Berman
ATTORNEYS.

United States Patent Office 3,524,802
Patented Aug. 18, 1970

3,524,802
PROCESS TO RECOVER COPPER FROM SULFIDE CONCENTRATES
Galen W. Clevenger, Salt Lake City, Utah
(P.O. Drawer U, Morenci, Ariz. 85540)
Filed Sept. 1, 1967, Ser. No. 665,703
Int. Cl. C22d 1/16
U.S. Cl. 204—108                                    1 Claim

ABSTRACT OF THE DISCLOSURE

Method of producing metallic copper in sheets comprising: (1) calcining a concentrated ore containing 20–30% copper to remove sulfur while oxidizing the iron content of the ore to produce predominantly ferric iron oxide; (2) leaching the calcined concentrate with sulfuric acid at pH 2–4 to produce copper sulfate solution while precipitating the ferric salts of iron; (3) removing the precipitate and subjecting the filtrate to electrolysis (to deposit metallic copper in sheets) at a current density of 50–100 amperes/square foot of electrode; while (4) constantly drawing liquor from the electrolysis vats and returning it to the leaching operation at a rate chemically equal to that at which said filtrate is supplied to said vats.

---

So far as this process is concerned, the starting material is a concentrate of which a typical analysis would be as follows:

Cu—20–30%
Fe—25–30%
S—30–40%
$SiO_2$—5–15%
$Al_2O_3$—1–2%
Au—0.01–0.02 oz. (troy) per ton
Ag—2.0–10.0 oz. (troy) per ton This concentrate is produced by conventional flotation processes applied to ores which as mined contain only 1 to 3% of copper. The copper, iron and sulfur in the above analysis occur largely as copper and iron sulfides.

The concentrate above described is then subjected to a calcining or roasting process under oxidizing conditions. The reaction is sufficiently exothermic to be self-sustaining under most conditions since both the iron and copper sulfides will be converted into oxides. The oxidizing condition is desirable since for reasons discussed hereinafter this promotes the formation of the ferric or trivalent form of iron oxide. The same calcining operation changes the copper sulfide to an acid soluble copper oxide.

Properly conducted, the calcine process produces an effluent gas containing from 6 to 8% concentration of sulfur dioxide which makes for highly economical recovery of the sulfur, whether as sulfuric acid, elemental sulfur, carbon disulfide or other product. In this particular case, conversion of the sulfur dioxide into sulfuric acid probably will be most economical since the process as a whole calls for considerable use of sulfuric acid.

A typical analysis of the product resulting from calcining will be as follows:

Cu—27–40% (mostly oxide)
Fe—30–40% (mostly oxide)
S—0.1–0.2% (mostly sulfides of iron and copper)
$SO_4$—1–2% (mostly as sulfates of iron and copper)
$Al_2O_3$—1–2%
Au—0.01–0.02 oz. per ton
Ag—2.0–10.0 oz. per ton The calcined product is then leached in sulfuric acid solution at pH between 2 and 3, though under some circumstances perhaps a pH of 4 could be tolerated. Any further increase in pH would tend to precipitate copper but in a pH of 2.5 to 3 substantially all of the ferric salts are precipitated.

The solution is filtered to remove the precipitates and the clear liquid which is chiefly copper sulfate is ready for electrolysis. The almost entirely iron free solution of copper sulfate permits use of higher, more efficient current densities in the step of electrolysis.

The electrolysis is carried out to deposit the copper in sheets with an electrode current density of 50 to 100 amps. per square foot of plate area. The electrolysis results not only in the deposition of metallic copper but in the formation of sulfuric acid. Controls are provided whereby the filtrate which is largely copper sulfate is added to the electrolytic bath at about the same rate as liquid containing primarily sulfuric acid is withdrawn from the bath. The process is continuous and the liquid withdrawn from the bath is returned to the aforementioned leaching system to provide substantially a closed cycle.

The foregoing process steps and the particular objects of this invention will be made clear from the following detailed description taken in connection with the annexed drawings, in which.

Figure 1:
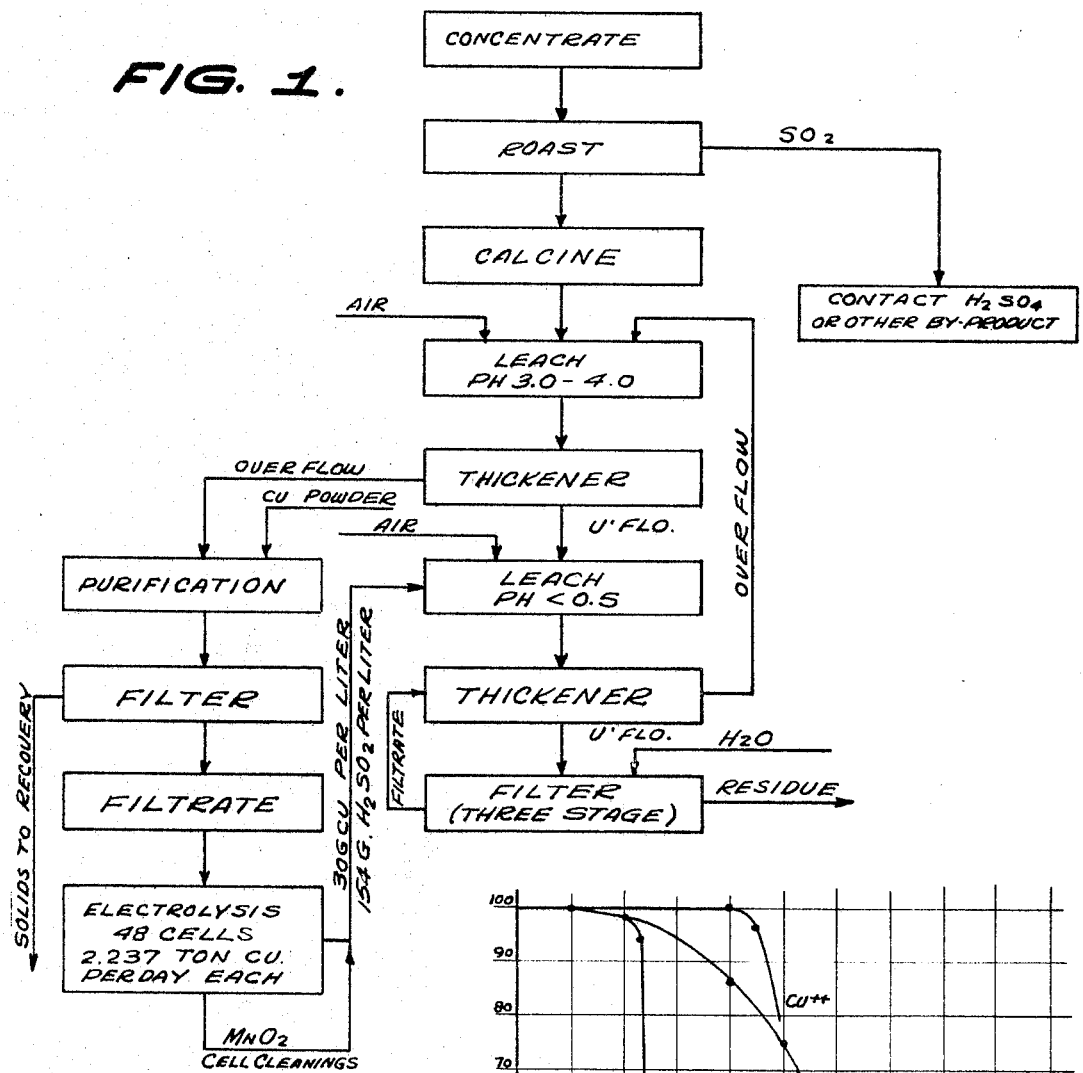
FIG. 1 is a flow sheet illustrating the process as a whole.

Referring now to FIG. 1, the starting material is a concentrate primarily of iron and copper sulfides from original crude ores containing as little as 1% or less by weight of metallic copper. The concentrate, however, contains in the region of 30% metallic copper by weight. The first step in the process is to convey the concentrate from the flotation or other concentrating process to a roaster. FIG. 1 shows a roasting step and a calcining step in series. This is a matter of preference and not of absolute necessity and the terms "roast" and "calcine" as used herein are synonymous. In the two steps illustrated, the objective of the first step entitled "roast" is to regulate the air so as to obtain in the effluent gases a maximum concentration of $SO_2$. Most of the sulfur is oxidized out of the iron and copper sulfides at this point, a second calcining step may be performed with a greater excess of air to accomplish not only further removal of the sulfur but particularly to assist in oxidizing iron from ferrous to ferric oxide, for reasons which will appear hereinafter.

The effluent gas from the roaster will contain from 6 to 8% $SO_2$ with, of course, some air and traces of $SO_3$. Given a gas of this concentration, quite obviously the sulfur may be recovered in any of several forms, e.g., flowers of sulfur or carbon disulfide. In the present case, preferably, the effluent gas is run through a dust trap of the "Precipitron" type and thence to a standard platinum or vanadium contact process for the production of sulfuric acid.

The all-solids product of the roasting and calcining is delivered to a leaching tank which is maintained at a pH between 2.5 and 4.0. Liquid supplied to the leaching tank is principally copper sulfate and sulfuric acid, derived primarily from the electrolysis step, as will hereinafter be defined. In order to maintain an oxidizing condition, the leaching tank is constantly aerated. Under the relatively high pH of this leaching step, air is the most effective oxidant. What is desired in this step is a maximum precipitation of the ferric salts, with the copper salts being converted to copper sulfate solution. The product of the leaching action is fed to a thickener which removes most of the solid. The solution overflows to a purification tank to which metallic copper powder may be added so as to precipitate the metals more electronegative than copper, such as silver, rhodium, lead, platinum and gold. This is entirely an optional step, depending on the quantity of the rare metals in the ore. It does, of course, have the additional effect of purification of the solution going to the electrolysis step.

Figure 2:
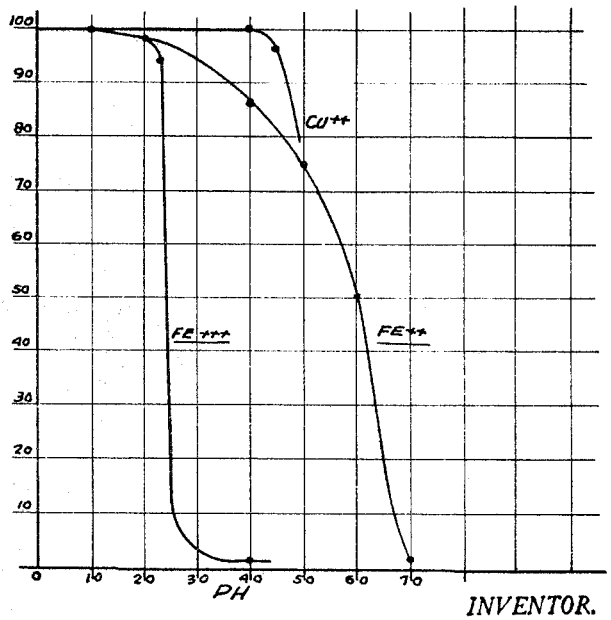
FIG. 2 is a chart of solubility against pH and is useful in illustrating some of the reactions.

The action and importance of the leaching step will be made clear from a consideration of FIG. 2, in which the solubility of ferric oxide and ferrous oxide and of copper are plotted against increasing pH. It will be noted that the trivalent or ferric iron has virtually complete precipitation at pH 2.5, while the bivalent or ferrous iron will not precipitate substantially below pH 7. This latter value would result in the precipitation of copper and, therefore, is to be avoided.

From the purification step, the liquor passes through a filter with solids going to special recovery if that is warranted. The clear filtrate then goes to the electrolytic step.

Figure 3:
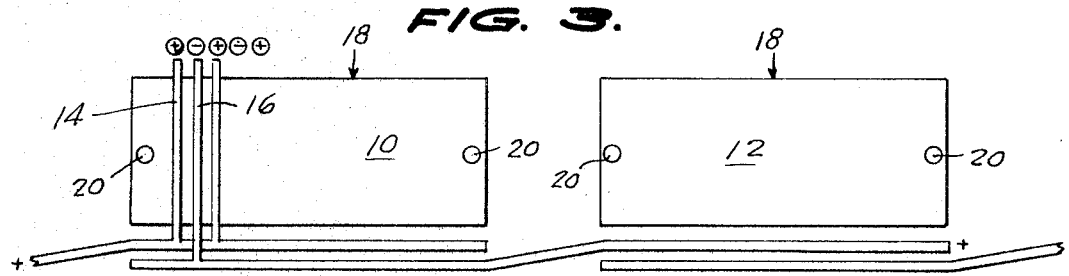
FIG. 3 is a view showing the interrelationship for positive and negative electrodes in the electrolytic process.

FIG. 3 shows a general arrangement of a pair of consecutive cells 10 and 12. Each cell contains a series of electrodes 14 and 16 which from left to right are alternately positive and negative in cell 10, the sequence from left to right being reversed in cell 12. The electrodes in each cell are in parallel but the cells themselves are in series. Each of the cells 10 and 12 have an inlet 18 for electrolyte and outlets 20 for electrolyte adjacent the end of each cell.

Figure 4:
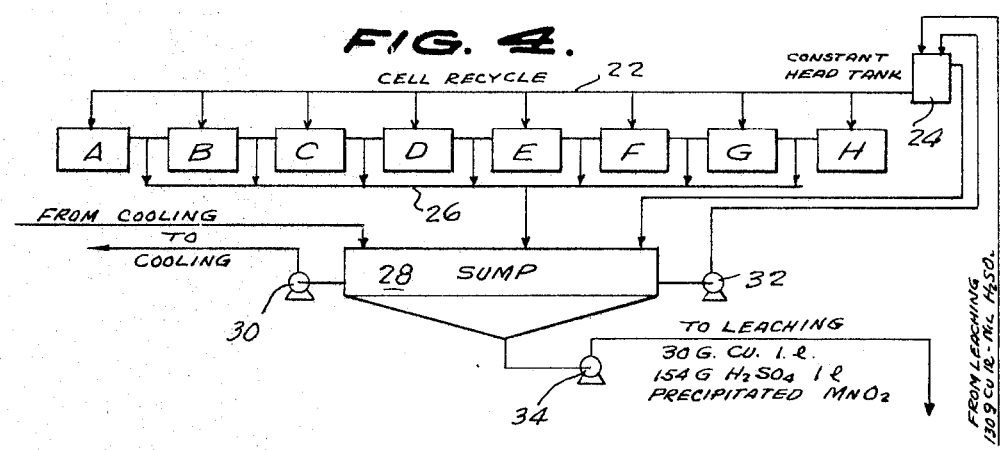
FIG. 4 is a schematic diagram showing the circulation of liquids in the electrolytic process.

A flow sheet of the electrolyte solution is illustrated in FIG. 4, in which a series of cells corresponding to cells 10 and 12 of FIG. 3 are denominated A-H. The cells are supplied through a line 22 from a constant head tank 24. Outflow from the cells goes through a line 26 to a sump 28. A pump 30 constantly withdraws electrolyte from the sump 28 and delivers it to a cooling means which may be a heat exchanger or a cooling tower and at the same time constantly returns the cool effluent to the sump. A second pump 32 constantly delivers liquor from the sump 28 to the constant head tank 24. A third pump 34 constantly delivers liquor from the sump 38 which liquor contains around 30 grams of metallic copper per liter and about 154 grams of sulfuric acid per liter and a certain amount of precipitated manganese dioxide. Manganese dioxide is introduced in the system in order to help oxidize the iron content from the ferrous to the ferric form of oxide, thereby facilitating its precipitation. The manganese oxide will be found regenerated in the electrolytic cells and thereby goes back into the system. The flow from pump 34 will be described hereinafter in detail in connection with FIG.1.

Figure 5:
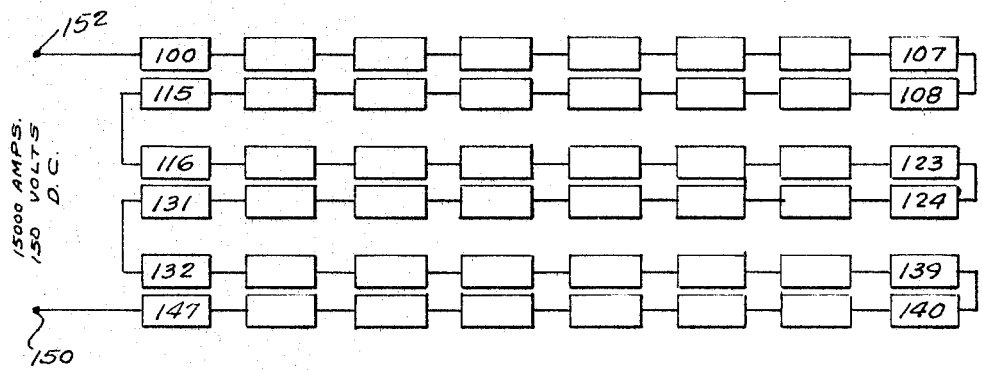
FIG. 5 is a schematic diagram illustrating the interconnection of multiple electrolytic cells, in this case, 48 cells.

FIG. 5 illustrates the general series arrangement of a multitude of cells in which it will be seen that about 150 volts D.C. applied across the terminals will produce about 15,000 amperes through the circuit as a whole. It is this overall arrangement of cells which drains into the sump or sumps 28.

Referring back to FIG. 1, it will be seen that the solids removed by the thickener which follows the first leaching step go to a secondary leach tank where they are diluted with a relatively low-copper, high-sulfuric acid solution from the pump 34. This leaching is carried out at a pH usually below 0.5. It will be noted that $MnO_2$ previously mentioned goes directly into the step. At very low pH, as in this step, $MnO_2$ is a more effective oxidant than air. The leaching products, including the liquor, go to a thickener, where liquid is removed and the solids then go to a 3-stage counterflow filter or washer in which the final wash is with clean water and the filtrate goes as wash water in the last-mentioned thickener. The wash water from this thickener, being diluted from the final 3-stage filter, goes back to the original leach step at a pH of 3.0 to 4.0. Cake from the last 3-stage filter usually will represent an irrecoverable residue and is discharged.

It is important that, as shown in FIG. 4, both the inflow to and outflow from the cells A-H be at a fairly active rate to avoid polarization of the electrodes. It is also essential in the interest of cell efficiency that the temperature of the electrolyte within the cells be reasonably controlled between 50 and 70 degrees C., which is the reason for the pump 30 and its associated cooler.

A process such as this may be carried out by means of an exceedingly wide variety of apparatus so that apparatus details per se have not been illustrated in this disclosure. Arrangements, as distinct from apparatus details, have been indicated but these simply are a matter of preference as, for example, the choice between the heat exchanger and the cooling tower, also, the selection of equipment as between conventional thickeners and what today are known as "solid bowl classifiers." This invention is not, therefore, to be limited to such details as are disclosed and described herein, but only as set forth in the subjoined claim.

What is claimed is:

1. A continuous process of producing metallic copper from a concentrate of iron and copper sulfides, said process comprising: continuously calcining said concentrate in an atmosphere having minimal excess air to produce maximum $SO_2$ in the effluent gas; and thereafter performing a second calcining step with substantial excess air whereby to convert copper sulfide to copper oxide and to convert iron sulfide to ferric oxide ($Fe_2O_3$); continuously leaching the calcined solids in the solution of sulfuric acid at pH 2.5–4.0 to precipitate solids from solution; continuously filtering out precipitated solids and continuously subjecting the remaining liquid to electrolysis at a current density of 50 to 100 amperes per square foot of electrode to deposit metallic copper and regenerate sulfuric acid the electrolysis being carried out with continuous circulation of the solution, a portion of the solution being cooled and directly returned to the electrolysis with continuous addition thereto of fresh liquid from the leaching step, and continuously withdrawing liquor from the electrolysis step and returning the liquor to the leaching step, the electrolysis temperature being controlled at between about 50° and about 70° C.

References Cited

UNITED STATES PATENTS

| | | | |
|---|---|---|---|
| 312,814 | 2/1885 | Cassel | 204—108 |
| 617,911 | 1/1899 | Smith et al. | 204—108 |
| 1,232,080 | 7/1917 | Pope et al. | 204—108 |
| 1,533,741 | 4/1925 | Kichline et al. | 204—108 |
| 1,598,296 | 8/1926 | MacKay | 204—108 |
| 3,427,237 | 2/1969 | Morris | 204—106 X |
| 2,730,493 | 1/1956 | Carlson | 204—108 |

PATRICK P. GARVIN, Primary Examiner

W. J. SHINE, Assistant Examiner

U.S. Cl. X.R.

204—106